United States Patent [19]

Hatanai et al.

[11] Patent Number: 4,695,512
[45] Date of Patent: Sep. 22, 1987

[54] MAGNETIC HEAD FOR PERPENDICULAR MAGNETIC RECORDING

[75] Inventors: Takashi Hatanai; Keishi Nakashima, both of Nagaoka, Japan

[73] Assignee: Alps Electric Co., Ltd., Japan

[21] Appl. No.: 800,056

[22] Filed: Nov. 20, 1985

[30] Foreign Application Priority Data

Nov. 22, 1984 [JP] Japan .................... 59-246162

[51] Int. Cl.$^4$ ............................. G11B 5/235
[52] U.S. Cl. .................... 428/408; 360/119;
360/120; 360/121; 360/125; 360/135; 427/131;
427/132; 428/473.5; 428/474.4; 428/447;
428/694; 428/900; 428/329
[58] Field of Search ............ 428/695, 694, 473.5,
428/329, 900, 474.4, 408, 447, 446; 427/131,
132; 360/135, 120, 119, 121, 125

[56] References Cited

U.S. PATENT DOCUMENTS

| | | | |
|---|---|---|---|
| 3,079,467 | 2/1963 | Rettinger | 360/120 |
| 3,480,935 | 11/1969 | Springer | 360/120 |
| 3,544,982 | 12/1970 | Hanak | 360/120 |
| 3,578,920 | 5/1971 | Okamoto | 360/120 |
| 3,656,229 | 4/1972 | Sakurai | 428/900 |
| 4,182,643 | 1/1980 | Calderon | 360/120 |
| 4,368,496 | 1/1983 | Kato | 360/120 |
| 4,398,229 | 8/1983 | McClure | 360/120 |
| 4,589,043 | 5/1986 | Grundtner | 360/121 |
| 4,608,293 | 8/1986 | Wada | 427/131 |

OTHER PUBLICATIONS

P. A. Albert et al., "Free-Standing Magnetic Films on Thin, Flexible Insulating Layers", *IBM Tech. Disclo. Bulletin*, vol. 14(5), (Oct. 1971).

*Primary Examiner*—Ellis P. Robinson
*Attorney, Agent, or Firm*—Guy W. Shoup

[57] ABSTRACT

A magnetic head for perpendicular magnetic recording includes a pair of substrates consituted by a non-magnetic material and having their opposing surfaces respectively formed with heat-resistant polymer films. A thin magnetic film is retained between these substrates. Further, a non-magnetic intermediate film is interposed between the thin magnetic film and each of the polymer films. The intermediate film has a coefficient of thermal expansion which is close to that of the thin magnetic film. Accordingly, no internal stress is generated in the thin magnetic film which would otherwise be caused by thermal expansion and shrinkage in manufacture. Thus, it is possible for the magnetic head to possess sufficiently high wear resistance and excellent magnetic properties.

5 Claims, 10 Drawing Figures

MAGNETIC HEAD FOR PERPENDICULAR MAGNETIC RECORDING

BACKGROUND OF THE INVENTION

1. Field of the Invention

The present invention relates to a magnetic head for perpendicular magnetic recording and, more particularly, to a magnetic head structure having a thin magnetic film with improved characteristics.

2. Description of the Prior Art

A large variety of types of magnetic head for perpendicular magnetic recording have heretofore been proposed.

One type of conventional magnetic head for perpendicular magnetic recording will first be described with reference to FIGS. 3, 4 and 5.

As shown in FIG. 3, a magnetic medium 3 which is constituted by a base film 1 and a magnetic film 2 is contacted by a magnetic head which is brought into contact with one side thereof. The magnetic head is arranged such that an electromagnetic coil 4 is disposed in a groove 9 in a core 5 which is formed with a central leg 5a and two side legs 5b and 5c and thus assumes a substantially W-shaped form in cross-section, and a substrate 6 which is constituted by a non-magnetic material is secured to the upper surface of the core 5 in such a manner that a thin magnetic film 7 is vertically disposed on the central leg 5a.

The following is a description of a method of manufacturing a magnetic head arranged as above. Namely, as shown in FIGS. 4(a) to 4(c), a thin magnetic film 7 which is constituted by a permalloy film, a cobalt-zirconium amorphous film or the like is formed by means of evaporation, sputtering, plating or the like on one side surface of a flat plate material 10 which is made of a non-magnetic material having wear resistance, such as a composite material of a ceramic, glass or carbon material and a metallic material and which constitutes the above-described substrate 6 (FIG. 4(b)). Then, the flat plate material 10 having the thin magnetic film 7 formed thereon is subjected to annealing. Thereafter, another flat plate material 14 which has the same quality and the same configuration as those of the above-described flat plate material 10 is bonded to the thin magnetic film 7 by means of glass or an adhesive (FIG. 4(c)).

On the other hand, grooves are cut in the upper surface of a core material 8 which is constituted by a square rod member of a soft-magnetic material, e.g., ferrite, sendust or laminated permalloy in a form such as that shown in FIG. 5(a) and in such a manner that the core material 8 has a substantially W-shaped cross-section, whereby a central leg 5a and two side legs 5b are formed with grooves 9 provided on both sides of the central leg 5a. Then, the core material 8 may be sliced into any desired width (FIG. 5(b)). After slicing, an electromagnetic coil 4 is disposed in the grooves 9 (FIG. 5(c)).

With the core 5 thus formed, the substrate 6 which has been formed as described above and sliced in conformity with the core 5 is bonded to the upper surface of the core 5 by means of glass or an adhesive. By this bonding, the thin magnetic film 7 which is located in the approximate center of the substrate 6 of a non-magnetic material is disposed on the central leg 5a of the core 5. Finally, polishing is carried out in such a manner that curved surfaces are formed on both sides of the substrate 6 as shown by the broken line in FIG. 5(d).

Incidentally, in forming a magnetic head which utilizes a thin magnetic film, the substrate 6 which retains the thin magnetic film 7 is required to possess a relatively low degree of surface roughness. This is because the magnetic properties of the thin magnetic film are affected by the degree of surface roughness of the substrate. In other words, as the thickness of the thin magnetic film decreases, the effect of the surface roughness of the substrate becomes more apparent.

In view of the above-described fact, it is general practice to employ a substrate made of a material which has a low degree of surface roughness, such as silicon or glass. However, such a material is not satisfactory in terms of wear resistance.

Wear resistance becomes an important factor particularly when a metallized tape or the like is employed as the recording medium.

For this reason, there has been an increasing tendency to employ as a substrate material one which has excellent wear resistance, such as carbon or a carbon-based material, e.g., a carbon-based composite material, or a ceramic-based material. However, since these materials are formed by sintering or other similar method, they undesirably have a large number of pores and it is unfavorably easy for them to be worn in small areas during the surface polishing, which fact disadvantageously makes it very difficult to form a flat surface.

In order to solve this problem, a magnetic head has been proposed which has a structure wherein a polymer film having heat resistance, such as a polyimide resin, is formed on the surface of a substrate made of a material such as mentioned above, and a thin magnetic film is sandwiched through this polymer film.

Such a magnetic head, however, involves the disadvantage that the magnetic properties of the thin magnetic film are deteriorated when forming the thin magnetic film on the polymer film by means, for example, of sputtering, this being due to the difference in terms of the coefficient of thermal expansion as between the polymer film material and the thin magnetic film material. More specifically, as a thin magnetic film material, Co-based alloys such as a cobalt-zirconium-niobium (Co-Zr-Nb) alloy may be employed. These alloys have a coefficient of thermal expansion of 100 to $110 \times 10^{-7}$ (cm/cm/° C.), whereas polyimide resins have a relatively large coefficient of thermal expansion, such as, 400 to $800 \times 10^{-7}$ (cm/cm/° C.) Accordingly, when the polymer film is cooled down from a high temperature to an ordinary temperature when forming the thin magnetic film by sputtering or other similar means, a relatively large contraction of the polymer film causes an internal stress in the thin magnetic film, resulting disadvantageously in deterioration of the magnetic properties of the thin magnetic film.

SUMMARY OF THE INVENTION

In view of the above-described circumstances, it is a primary object of the present invention to provide a magnetic head for perpendicular magnetic recording which has high wear resistance and excellent magnetic properties.

To this end, the invention provides a magnetic head for perpendicular magnetic recording which comprises: a pair of substrates constituted by a non-magnetic material and having their opposing surfaces respectively formed with heat-resistant polymer films; a thin magnetic film interposed between these substrates; and a non-magnetic intermediate film disposed between the thin magnetic films and each of the heat-resistant polymer films, the intermediate film having a coefficient of thermal expansion close to that of the thin magnetic film.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
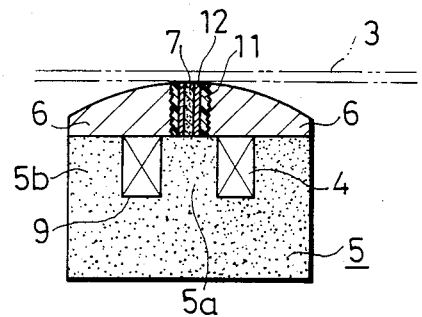
FIG. 1 is a sectional view of one embodiment of the present invention.

FIG. 1 is a sectional view of one embodiment of the present invention. Since the respective structures of the electromagnetic coil 4, the core 5 and the substrate 6 are the same as those of the above-described prior art, they are not shown in detail in FIG. 1.

In this embodiment, the substrate 6 is made of a carbon-based composite material. More specifically, either a carbon or graphite material such as a natural graphite, synthetic graphite, coal coke, petroleum coke, carbon black and coal powder, or a mixture of these materials, and a binder which is constituted by a thermosetting resin such as a phenolic resin, a divinylbenzene resin, a furan resin and an epoxy resin, or a thermoplastic resin such as a fluorine resin and a polyacetal resin, are mixed together and sintered, and then voids present in the surface of and within this sintered material are filled with a metal such as tin, antimony, copper, zinc, silver, lead, aluminum, magnesium or cadmium, or an alloy of these metals by means of impregnation at a temperature higher than the melting point of the impregnated metal or alloy by about 50° to 100° C., thereby producing a carbon-based composite material with an increased mechanical strength.

As a material for the substrate 6, ceramic or ferrite or a composite material of these materials may be employed in addition to the above-described carbon-based composite materials.

Figure 2:
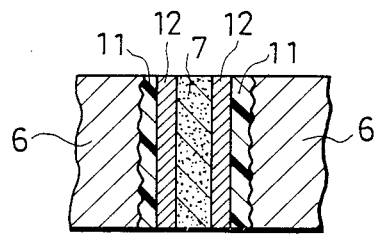
FIG. 2 is an enlarged sectional view of an essential portion of the invention.

As shown in FIG. 2 in enlarged view, polymer films 11 constituted by a material such as a polyimide resin, a silicone resin or a polyamide resin are formed on the respective opposing surfaces of the pair of substrates 6. The polymer films 11 are suitably formed by a method utilizing, for example, so-called spinner coating in which a resin is dropped on each substrate 6 in the form of points while the substrate 6 is being rotated at high speed, whereby the resin is stretched over the surface of the substrate 6 by means of centrifugal force such as to form a coating film 11, which is then thermoset at a treating temperature of, for example, 350° C.

Since the above-described substrate 6 includes a large number of pores, even if polishing is effected, the surface roughness thereof after polishing is on the order of $R_{max} = 1$ μm. It is still difficult for a substrate 6 with a minimized number of pores to have a surface roughness below $R_{max} = 0.2$ μm.

However, a substrate 6, for example, which is coated with a polyimide resin by employing the above-described method is favorably reduced in terms of the surface roughness to the order of $R_{max} = 0.05$ μm.

Each substrate 6 thus formed with the polymer film 11 is further formed with a non-magnetic intermediate film 12 on the polymer film 11.

The intermediate film 12 is constituted by a material, for example, aluminum oxide ($Al_2O_3$) or silicon oxide ($SiO_2$) and is laminated on the polymer film 11 by sputtering or other similar method.

The coefficient of thermal expansion of aluminum oxide is about $80 \times 10^{-7}$(cm/cm/° C.), which is very close to the coefficient of thermal expansion of a cobalt-based magnetic material which constitutes the thin magnetic film 7, that is, 100 to $110 \times 10^{-7}$(cm/cm/° C.) The coefficient of thermal expansion of silicon oxide is about $4 \times 10^{-7}$(cm/cm/°), which is relatively small but closer to the coefficient of thermal expansion of the thin magnetic film 7 than that of the polymer film 11, that is, 400 to $800 \times 10^{-7}$(cm/cm/° C.). It is therefore possible for silicon oxide to be employed as a material for the intermediate film 12 in accordance with the invention.

A single thin magnetic film 7 is interposed between the pair of intermediate films 12. The thin magnetic film 7 is constituted by a cobalt-based material similar to one employed in the prior art and is formed by sputtering, evaporation or other similar known method.

Figure 3:
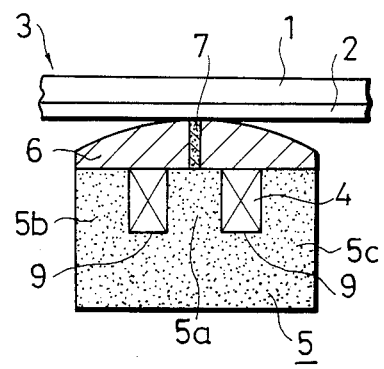
FIG. 3 is a sectional view of a conventional magnetic head.
Figure 4A:
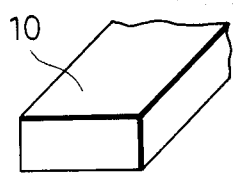
FIGS. 4(a), 4(b) and 4(c) show steps carried out in manufacturing a thin magnetic film in a conventional magnetic head.
Figure 4C:
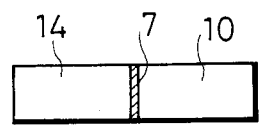
Figure 4B:
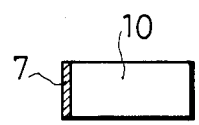
Figure 5A:
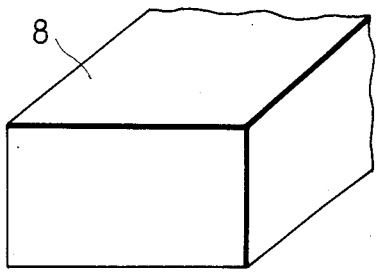
FIGS. 5(a), 5(b), 5(c) and 5(d) show steps carried out in assembling the conventional magnetic head as a whole.
Figure 5B:
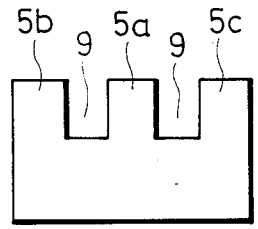
Figure 5C:
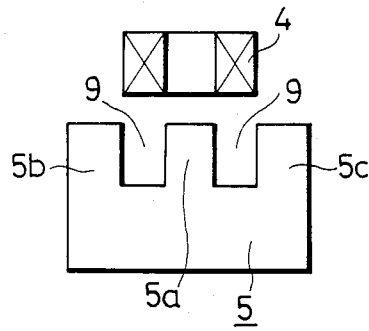
Figure 5D:
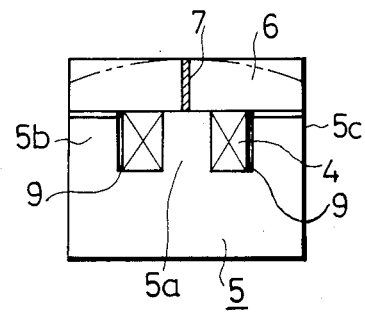

It is to be noted that, although the method of manufacturing the above-described magnetic head is substantially similar to the prior art shown in FIGS. 2 to 4, in the present invention one step is additionally provided in which the polymer films 11 and the intermediate films 12 are successively formed on the respective substrates 6 as described above before the thin magnetic film 7 is formed on the substrates 6. It is to be noted also that, although the description of the embodiment of the invention has been made with respect to the main pole exciting type magnetic head, it is possible for the invention to be applied to the main pole of an auxiliary pole exciting type magnetic head.

As has been described above, the respective opposing surfaces of the pair of substrates are in accordance with the present invention coated with the heat-resistant polymer films. There is therefore no adverse effect on the magnetic properties of the thin magnetic film even when the substrates are constituted by a material which has a large number of pores, such as a carbon-based composite material. Accordingly, it is possible for the magnetic head to possess sufficiently high wear resistance. Further, since the thin magnetic film is formed on the polymer films through intermediate films which have a coefficient of thermal expansion which is close to that of the thin magnetic film, no internal stress is generated in the thin magnetic film which would otherwise be caused by thermal expansion and shrinkage during manufacture. Thus, it is possible for the thin magnetic film to maintain excellent magnetic properties.

What is claimed is:

1. A magnetic head for perpendicular magnetic recording comprising:

a pair of substrates constituted by a non-magnetic material and having their opposing surfaces respectively formed with heat-resistant polymer films for reduced surface roughness of $R_{max}=0.05$ microns;

a thin magnetic film retained between said substrates; and a non-magnetic intermediate film interposed between said thin magnetic film and each of said heat-resistant polymer films and having a coefficeint of thermal expansion which is close to that of said thin magnetic film.

2. A magnetic head for perpendicular magnetic recording according to claim 1, wherein each of said substrates is constituted by a carbon-based composite material.

3. A magnetic head for perpendicular magnetic recording according to claim 2, wherein said carbon-based composite material is formed in such a manner that either a carbon or graphite material, or a mixture of these materials, and a binder which is constituted by a thermosetting or thermoplastic resin are mixed together and sintered, and this sintered material is impregnated with a metal or an alloy so that said metal or alloy fills voids in the surface of and within said sintered material.

4. A magnetic head for perpendicular magnetic recording according to claim 1, wherein each of said substrates is constituted by a material selected from the group consisting of ceramics, ferrite and a composite material of these materials.

5. A magnetic head for perpendicular magnetic recording according to claim 1, wherein each of said polymer films is constituted by a material selected from the group consisting of a polyimide resin, a silicone resin and a polyamide resin.

* * * * *